UNITED STATES PATENT OFFICE.

SADAKICHI SATOW, OF SENDAI, JAPAN.

VEGETABLE PROTEID PRODUCT AND PROCESS OF MAKING THE SAME.

1,245,975.  Specification of Letters Patent.  Patented Nov. 6, 1917.

No Drawing.  Application filed November 25, 1916.  Serial No. 133,312.

*To all whom it may concern:*

Be it known that I, SADAKICHI SATOW, a subject of the Emperor of Japan, residing at Sendai, Japan, have made a certain new and useful Invention in Vegetable Proteid Product and Processes of Making the Same, (Case H,) of which the following is a specification.

This invention relates to condensation products of vegetable proteids such as the proteids of bean, corn, wheat, or the like, and the method of making the same.

The object of the invention is to provide commercial products utilizing vegetable proteids which products possess a high degree of transparency, flexibility and elasticity, and a simple, efficient and economical process of manufacturing the same.

A further object is to provide a non-inflammable celluloid-like substance as a condensation product of vegetable proteids, and a method of making the same, employing therefor as a condensing agent, tannin or an active methylene compound such as formaldehyde, hexamethylene tetramin, trioxymethylene, or the like.

Other objects of the invention will appear more fully hereinafter.

Proteids possess amphoteric properties owing to the presence of carboxyl and amino groups, and therefore form salts with bases or acids. For example glycinin which forms the chief constituent of soya beans has strong acid properties due to the predominance of carboxyl groups over amino groups and therefore it has a strong tendency to form complex salts with alkaline reacting agents such as alkalis or alkali salts of weak acids, or organic bases. I call the complex salts of proteids with alkaline reacting agents by the term "alkali compound" hereinafter. Legumin, gliadin, phaseolin, zein and other proteids contained in many vegetables, grain and cereals, such as beans, peas, lentils, corn, wheat and the like, possess the same property of forming the alkali compounds. The alkali compounds of these proteids differ in properties from the original proteids in many and commercially important respects. They are more transparent and possess much greater plasticity, elasticity, flexibility, tenacity, and adhesiveness, than the original proteids. The most important and vital difference, however, is the property of producing totally different condensation products with active methylene compounds or other condensing agents. The condensation products of alkali compounds of proteids with formalin or other condensing agents are superior to those obtained by direct condensation of proteids with formalin or other condensing agents in the following respects.

Firstly, the former possess great adhesiveness and are therefore easy to mold, while the latter possess almost no adhesiveness and are almost impossible to mold.

Secondly, the former possess a high degree of elasticity and flexibility and are therefore easy to re-form, while the latter possess almost no elasticity or flexibility and cannot be re-formed.

Thirdly, the former have only a moderate speed of condensation and therefore are easy to handle during the condensation process, and are also easy to work into a homogeneous mass, while the latter condense very rapidly or almost instantaneously and therefore require hurried operation during the condensation and are difficult to work into a homogeneous mass.

Fourthly, the former have no tendency to crack while drying, while the latter have a strong tendency to crack in drying which is highly undesirable for commercial use.

Fifthly, the former are, in themselves, transparent without being subjected to pressure, while the latter are opaque or slightly translucent even when subjected to high pressure.

Sixthly, the former possess a greater strength against mechanical stress or strains than the latter.

Seventhly, the former are more easily handled than the latter while drying, pressing, finishing, cutting or sawing with tools.

Since glycinin, legumin, gliadin, phaseolin, zein, and other proteids possess the property of forming alkali compounds in the presence of alkalis, alkali salts of weak acids, or organic bases, whether added directly thereto, or to their condensing agents, or to both, it will be seen that any vegetable, leguminous product, grain, cereal, corn, or the like containing these proteids may be employed in carrying out my invention. I do not desire to limit myself, therefore, to the use of any particular proteid-containing material.

I have also discovered that the various proteids named are just as suitable, in carrying out my invention, for use in their partially hydrolyzed state as in their undecomposed natural state. My invention therefore is not to be limited or restricted in respect to the condition or state of the proteids employed.

In carrying out my invention the alkali compounds of the proteids are produced by treating the proteids with dilute alkali or compounds which react alkaline in solution, such as caustic soda, lime, or sulfids, borates, silicates, carbonates, phosphates, sulfites, formates, acetates, or any organic acid salts of alkali metals or ammonia, or organic bases such as pyridin, urea, glycin, or other amino compounds which react alkaline in solutions.

In order to produce the condensation product the alkali compounds of the proteids are treated with such organic compounds as tannin, hexamethylenetetramin, trioxymethylene, aldehydes of aliphatic or aromatic series, or any other active methylene compounds, and which compounds I will call condensing agents.

I will now set forth some specific examples of the manner of carrying out my invention.

Example 1: The vegetable proteid containing material, whether leguminous, grain, cereal, corn or the like is treated to procure the refined proteidal products therefrom. This may be accomplished by crushing the material, and, if necessary, removing the oil content from the crushed mass, thus producing a "meal". This meal may be treated in any one of several methods to procure the refined proteidal product therefrom. For instance, by extracting the meal with water or a dilute solution of alkali, and then, either with or without purification of the resulting liquid to remove impurities therefrom, precipitating the dissolved proteids by a solution of acid, or by a ferment. Another method is to extract the meal with an aqueous solution of salt such as sodium chlorid, ammonium sulfate, or the like, and dialyzing the resulting solution. The proteidal product obtained, whether from the one or another of the methods described, is then kneaded with a ten per cent. solution of borax in the proportion of about 100 pounds of wet proteids to 2 gallons of the borax solution. The white mass of wet proteids gelatinizes at the beginning of the kneading operation and becomes more and more sticky and transparent, as the kneading operation proceeds, finally becoming a semi-transparent elastic mass. When it is dried at ordinary temperature it gradually turns to a transparent mass, without showing any cracks. It may be molded or reformed under pressure by a hot hydraulic press. It is then immersed in a solution of formaldehyde. If necessary or desired any suitable pigment or coloring matter may be added to the mass during the kneading operation.

Example 2: The refined proteidal matter procured as described in Example 1 is first kneaded with a concentrated solution of urea, and afterward with a forty per cent. solution of formaldehyde, and is then molded and dried.

Example 3: The refined proteidal matter procured as above described is kneaded thoroughly with a mixture of sodium acetate solution and formalin, with, if desired, suitable pigments or coloring matter added, and the resulting mass is finally molded and dried.

It is to be understood that in its broadest scope as defined in the claims, my invention is not to be limited or restricted to the special methods of preparing, degree of concentration, or order of mixing set forth in the examples given above, as said examples are designed to be illustrative, nor is my invention to be restricted, in its broadest scope, to the use of any particular proteid containing material, nor to the use of borax, acetate or any particular alkaline reacting compound, nor to formalin, as any proteid containing material, any alkali salt of weak acid, or any organic base, as well as alkali itself, and any condensing agent may be employed in carrying out my invention. It is also to be understood that many viscous, plastic materials, such as hydrocellulose, oxy-cellulose, or cellulose-esters, and which I will herein refer to as cellulose derivatives, or other viscous substances, can be added to the mass during or after the operation in a suitable proportion according to the properties of the products desired. Furthermore organic as well as inorganic filling material can be added if desired. It is further to be understood that in carrying out my invention any proteid containing material in its crude state, whether admixed with fibers, carbohydrates or not, can also be used directly without further purification of proteids.

The product of the process above described is a celluloid-like substance which is non-inflammable, and is water and acid proof. It is a good insulator of electricity and may be used as a substitute for ebonite, celluloids, bakelite, ivory or marble.

Having now set forth the objects and nature of my invention, and the manner of carrying the same into operation, what I claim as new and useful, and of my own invention, and desire to secure by Letters Patent, is,—

1. The process of manufacturing condensation products of proteidal substances which consists in glutinizing the separated proteidal substances with a compound which reacts alkaline in solution.

2. The process of manufacturing condensation products of proteidal substances with condensing agents, which consists in first glutinizing the proteidal substances, by the action of compounds which react alkaline in solution, and then condensing the resulting mass.

3. The process of manufacturing condensation products of proteidal substances which consists in glutinizing such substances with an alkaline reacting substance and then condensing the resulting mass.

4. The process which consists in separating the vegetable proteidal matter from suitable raw material, then purifying the proteidal products and then glutinizing the purified products with an agent which reacts alkaline in solution and finally condensing the resulting mass.

5. The process of manufacturing condensation products of proteidal substances which consists in treating such substances with sodium sulfite.

6. The process of manufacturing products of proteidal substances which consists in treating the said substances with sodium sulfite and a condensing agent.

7. The process which consists in crushing vegetable proteid containing material and removing the oil content from the crushed mass, then extracting the proteidal matter in a liquid solution and separating the said matter from the liquid, and finally glutinizing the separated matter with an agent which reacts alkaline in solution.

8. The process which consists in extracting in a liquid solution the proteidal substances of proteid containing material, and separating such substances from the liquid solution, and finally glutinizing the separated proteidal substances with an alkaline reacting agent.

9. The process which consists in extracting in a liquid solution the proteidal substances of proteid containing material, then purifying the liquid solution and separating therefrom the proteidal substances contained therein, and finally glutinizing the separated proteidal substances with an alkaline reacting agent.

10. The process which consists in extracting in a liquid solution the proteidal substances of proteid containing material, and separating such substances from the liquid solution, and then glutinizing the separated proteidal substances with an alkaline reacting agent and finally condensing the glutinized mass.

11. The process which consists in extracting in a liquid solution the proteidal substances of proteid containing material, and separating such substances from the liquid solution, then glutinizing the separated substances with an alkaline reacting agent and a condensing agent.

12. The process which consists in extracting in a liquid solution the proteidal substances of proteid containing material, and separating such substances from the liquid solution, then treating the separated substances with an alkaline reacting agent to glutinize the same and an active methylene compound to condense the mass.

13. The process which consists in glutinizing vegetable proteidal substances with an alkaline reacting agent and treating the mass with an active methylene compound.

14. As a new article of manufacture a condensation product of glutinized vegetable proteid with a condensing agent, said product being in the form of a transparent celluloid-like substance non-inflammable, and water and acid proof.

15. As a new article of manufacture a condensation product of alkali compounds of proteids with a condensing agent, said product being in the form of a celluloid-like substance which is plastic, elastic, flexible and substantially transparent.

16. As a new article of manufacture a condensation product of alkali compounds of proteids with a condensing agent, said product being in the form of a transparent celluloid-like substance.

17. The process of manufacturing condensation products of proteidal substances which consists in glutinizing such substances with an alkaline reacting substance and adding a viscous plastic substance to the glutinized mass.

18. The process of manufacturing condensation products of proteidal substances which consists in glutinizing the substances with an alkaline reacting agent, and incorporating a viscous plastic substance into the mass, and finally condensing the mass with a condensing agent.

19. The process of manufacturing condensation products of proteidal substances which consists in glutinizing such substances with an alkaline reacting substance then adding cellulose derivatives to the glutinized mass and finally condensing said mass.

20. As a new article of manufacture a transparent celluloid-like substance which contains a condensation product of alkali compounds of proteids with a condensing agent.

21. As a new article of manufacture a transparent celluloid-like substance which contains a condensation product of alkali compounds of proteids with a condensing agent together with a cellulose derivative.

In testimony whereof I have hereunto set my hand on this 23rd day of November A. D., 1916.

SADAKICHI SATOW.